United States Patent
Anderson et al.

(10) Patent No.: US 7,229,587 B2
(45) Date of Patent: Jun. 12, 2007

(54) BLOW MOLDED CONTAINER HAVING HOLES THEREIN AND METHOD AND APPARATUS FOR FACILITATING THE CREATION THEREOF

(75) Inventors: Jeffrey Scott Anderson, Clinton, IA (US); Pamela Jo Naeve, Clinton, IA (US)

(73) Assignee: Custom - Pak, Inc., Clinton, IA (US)

( * ) Notice: Subject to any disclaimer, the term of this patent is extended or adjusted under 35 U.S.C. 154(b) by 338 days.

(21) Appl. No.: 10/766,602

(22) Filed: Jan. 27, 2004

(65) Prior Publication Data
US 2004/0197436 A1    Oct. 7, 2004

Related U.S. Application Data

(60) Provisional application No. 60/460,199, filed on Apr. 3, 2003.

(51) Int. Cl.
B29C 49/50    (2006.01)

(52) U.S. Cl. .................. 264/534; 264/155; 264/156; 425/525; 425/527; 425/301

(58) Field of Classification Search ........... 425/525, 425/527, 531, 301; 264/155, 156, 531, 534; B29C 49/50
See application file for complete search history.

(56) References Cited

U.S. PATENT DOCUMENTS

| | | | | |
|---|---|---|---|---|
| 3,342,916 A * | 9/1967 | Peters | .................. | 264/536 |
| 3,362,043 A * | 1/1968 | Langdon et al. | ............ | 425/215 |
| 3,424,829 A * | 1/1969 | Alexander et al. | .......... | 264/529 |
| 3,499,071 A * | 3/1970 | Hurst | .................. | 264/536 |
| 3,579,620 A * | 5/1971 | Petterson | ............ | 264/520 |
| 3,585,681 A * | 6/1971 | Branscum et al. | .......... | 425/150 |
| 3,892,513 A * | 7/1975 | Mehnert et al. | ............ | 425/525 |
| 3,928,522 A * | 12/1975 | Farrell | .................. | 264/530 |
| 4,030,664 A | 6/1977 | Tisbo et al. | ............ | 239/289 |
| 4,213,217 A * | 7/1980 | Kretschmer et al. | ............ | 8/151 |
| 4,280,805 A | 7/1981 | Hafele | .................. | 425/525 |
| 4,357,296 A | 11/1982 | Hafele | .................. | 264/532 |
| 4,359,838 A | 11/1982 | Dooley | ............ | 47/1.01 R |
| 4,392,594 A | 7/1983 | Swett et al. | ............ | 222/532 |
| 4,471,912 A | 9/1984 | Hancock | ............ | 239/497 |
| 4,604,044 A | 8/1986 | Hafele | .................. | 425/525 |
| 4,700,892 A | 10/1987 | Cunning | ............ | 239/289 |
| 4,909,978 A | 3/1990 | Hasegawa et al. | .......... | 264/516 |
| 4,952,133 A | 8/1990 | Hasegawa et al. | .......... | 425/503 |
| 4,992,230 A | 2/1991 | Belcher | ............ | 264/513 |
| 4,993,931 A | 2/1991 | Belcher | ............ | 264/513 |

(Continued)

OTHER PUBLICATIONS

Donald V. Rosato et al, Blow Molding Handbook, 1989, Oxford University Press, pp. 268-273.*

*Primary Examiner*—Robert B. Davis
(74) *Attorney, Agent, or Firm*—St. Onge Steward Johnston & Reens LLC (57) ABSTRACT

A method and apparatus for facilitating the creation of holes in a blow molded container is disclosed generally comprising first and second mold portions mounted adjacent each other along a seam and a mechanism for creating holes at the seam. In some embodiments, first and second punches are used to create one hole underneath the container's handle. In some embodiments, a third mold portion is used to create a rose surface and create a plurality of holes therein.

33 Claims, 9 Drawing Sheets

U.S. PATENT DOCUMENTS

| | | | |
|---|---|---|---|
| 5,000,904 A | 3/1991 | Schiemann | 264/515 |
| 5,267,412 A | 12/1993 | Bergin | 47/48.5 |
| 5,316,184 A | 5/1994 | Düring | 220/107 |
| 5,776,518 A * | 7/1998 | Wohlgemuth | 425/182 |
| 5,915,628 A | 6/1999 | Kriezel | 239/377 |
| 6,444,158 B1 | 9/2002 | Grob et al. | 264/516 |
| 2003/0102605 A1 | 6/2003 | Rutenbeck | 264/531 |
| 2004/0065636 A1* | 4/2004 | Thibodeau et al. | 215/398 |

* cited by examiner

BLOW MOLDED CONTAINER HAVING HOLES THEREIN AND METHOD AND APPARATUS FOR FACILITATING THE CREATION THEREOF

RELATED APPLICATIONS

This patent application claims the benefit of, under Title 35, United States Code, Section 119(e), U.S. Provisional Patent Application No. 60/460,199, filed Apr. 3, 2003.

FIELD OF THE INVENTION

The present invention relates to a method and apparatus for facilitating the creation of holes in a blow-molded container. More specifically, the invention relates to a method and apparatus for creating fill holes and spout holes in a pouring container when the container is blow-molded.

BACKGROUND OF THE INVENTION

The use of blow-molding as a method for manufacturing various sorts of articles is generally well know. Typically, this process involves the use of a mold consisting of two separate halves or portions having cavities of particularly desired shapes and sizes. Usually, one extrudes a large-diameter, sealed tube of molten material (commonly referred to as a "parison"), places the tube between the mold halves, and closes the mold around the tube. Fluid pressure is then introduced into the tube, forcing the molten tube against the walls of the cavities, conforming the tube to the shape thereof. The pressure is maintained until the molten material cools and solidifies. The pressure is then released, the mold halves are pulled apart, and the hardened article is ejected therefrom.

One such article that is commonly manufactured in this manner is pouring containers. In many blow molded containers, and particularly in pouring containers, it is desired or necessary to create holes in the container. However, because the blow molding process involves the use of a parison with a continuous, unbroken surface, the mold itself cannot form any holes other than the hole through which the fluid pressure is introduced. Cutting these holes after the blow molding process is completed and the container has been ejected from the mold, however, requires additional tooling and additional manufacturing steps, entailing further difficulty, time, and expense. Moreover, because the hole is often in a location that is difficult to access with the cutter, defects in the quality of the cut often result.

Accordingly, various methods and devices have been suggested to create these holes in blow molded articles during the blow molding process, such as that disclosed in disclosed in U.S. Patent Application No. US 2003/0104098 in the name of Schrader, which is incorporated herein by reference. However, one problem that arises in the case of pouring containers is that it is typically desired to produce the container with a handle. Therefore, the mold must have a section with a cavity for creating the reservoir (or body) portion of the container and a section with a cavity for creating the handle of the container. Usually, of course, it is desired to have a large fill hole at the top of the reservoir portion, both for convenience and in order to allow the reservoir section of the container to be filled to maximum capacity. However, this hole is under the handle, and thus, the handle section of the mold blocks the path of any punch that would otherwise be used to create the fill hole.

Additionally, one type of pouring container for which the blow molding process is particularly well suited is watering cans. A watering can typically has a spout with a frusto-conical end (commonly called a "rose"), flaring out to a wide surface having many small holes, through which the water exits the can. In order to create these many small holes, the rose is manufactured as a separate part and then assembled onto the blow molded container.

One disadvantage of creating the rose as a separate part, however, is that it requires additional steps in the manufacturing process, resulting in increased time and expense. Moreover, the end of spout must be threaded in order to permit the rose to be screwed on, which results in significant additional tooling, and thus, additional costs. Another disadvantage of a separate rose part that is screwed on to the spout is that it presents the possibility of leakage through and/or irregular flow over the joint between the rose and spout. Finally, yet another disadvantage of a separate rose part is that the rose often becomes separated from the watering can and subsequently lost, either while in transit, or in a store or the ultimate purchaser's home, thereby rendering the entire watering can virtually useless.

What is desired, therefore, is a method and apparatus that facilitates the creation of holes in a blow molded pouring container that does not require additional tooling or manufacturing steps and does not require the production of separate container parts.

SUMMARY OF THE INVENTION

Accordingly, an object of the present invention is to provide a method and apparatus for facilitating the creation of holes in a blow molded container that does not require separate cutting steps after the container has been blow molded.

It is another object of the present invention to provide a method and apparatus for facilitating the creation of holes in a blow molded container that does require the use of additional tooling.

It is yet another object of the present invention to provide a method and apparatus for facilitating the creation of holes in a blow molded container that permits the container to be blow molded as a single unit.

To overcome the deficiencies of the prior art and to achieve at least some of the objects and advantages listed, the invention comprises an apparatus for facilitating the creation of holes in a blow-molded container, including a mold comprising first and second mold portions that, when located adjacent each other along a seam, at least partially enclose a reservoir cavity against which a wall of the blow-molded container is blown during blow molding, wherein the first and second mold portions have respective first and second gaps therein that, when the first and second mold potions are located adjacent each other, form a hole in the mold that intersects the seam, a first punch that, when in a first position, is disposed within the first gap, and a second punch that, when in a first position, is disposed within the second gap, wherein, when the first and second mold portions are located adjacent each other, the first punch is located adjacent the second punch such that, when the first and second punches are in a second position, at least part of each of the punches is extended past the wall of the blow molded container and inside the reservoir cavity such that the punches collectively create one hole in the wall of the blow molded container.

In another embodiment, the invention comprises an apparatus for facilitating the creation of holes in a blow molded container, including a mold comprising first and second mold portions that, when located adjacent each other along a seam, at least partially enclose a cavity against which the wall of the blow molded container is blown during blow molding, wherein, the first and second mold portions have respective first and second gaps therein that, when the first and second mold portions are located adjacent each other, form a hole that intersects the seam, and a third mold portion that covers the hole when located adjacent thereto, the third mold portion having a surface against which the wall of the blow molded container is blown during blow molding, wherein the third mold portion includes at least one pin adapted to create a hole in the wall of the blow molded container.

In yet another embodiment, the invention comprises an apparatus for facilitating the creation of holes in a blow molded container, including a mold comprising first and second mold portions that, when located adjacent each other along a seam, at least partially enclose a spout cavity and a reservoir cavity, against which the wall of the blow molded container is blown during blow molding, wherein, the spout cavity has a first end, in fluid communication with the reservoir cavity, and a second end, wherein, the first and second mold portions have respective first and second gaps therein that, when the first and second mold portions are located adjacent each other, form a hole that intersects the seam, and a third mold portion that covers the hole when located adjacent thereto, the third mold portion having a surface against which the wall of the blow molded container is blown during blow molding, wherein, the third mold portion is located adjacent the second end of the spout cavity when the third mold portion is located adjacent the hole.

In still another embodiment, the invention comprises an apparatus for facilitating the creation of holes in a blow molded container blown in a mold having first and second mold portions, including an outer housing adapted to be mounted to at least one of the mold portions, an inner housing disposed in the outer housing, a wall member affixed to the inner housing, the wall member having a molding surface and a plurality of holes therein, a die disposed in the inner housing, the die having a plurality of pins protruding therefrom, a housing actuator disposed in the outer housing adapted to move the inner housing within the outer housing when the first and second mold portions are moved adjacent each other so that the wall of the blow molded container can be blown against the molding surface during blow molding, and a die actuator disposed in the inner housing adapted to move the die within the inner housing and cause the plurality of pins to move through the plurality of holes in the wall member to create a plurality of holes in the wall of the blow molded container.

In yet another embodiment, the invention comprises a method of facilitating the creation of holes in a blow-molded container, including the steps of moving a first mold portion adjacent to a second mold portion along a seam, thereby at least partially enclosing a reservoir cavity and a handle cavity, blowing a wall of the blow molded container against the reservoir cavity and the handle cavity, and simultaneously extending at least part of adjacent first and second punches, which are disposed in a hole intersecting the seam, through the wall of the blow molded container and into the reservoir container such that the punches collectively create one hole in the wall of the blow molded container.

In still another embodiment, the invention comprises a method of facilitating the creation of holes in a blow-molded container, including the steps of moving a first mold portion adjacent to a second mold portion along a seam, thereby at least partially enclosing a reservoir cavity and a spout cavity, moving a third mold portion adjacent to a hole intersecting the seam such that a molding surface of the third mold portion covers the hole, and blowing a wall of the blow molded container against the reservoir cavity, spout cavity, and molding surface.

In yet another embodiment, the invention comprises a blow-molded watering can, including a reservoir portion, a handle portion integrally formed with the reservoir portion, a spout portion integrally formed with the reservoir portion, and a rose portion integrally formed with the spout portion.

In still another embodiment, the invention comprises a blow-molded watering can, including a reservoir portion, a handle portion integrally formed with the reservoir portion, and a spout portion integrally formed with the reservoir portion, wherein, the reservoir portion has a punched fill hole that intersects a vertical plane of the handle portion.

In yet another embodiment, the invention comprises a method of creating a watering can having a handle, including the steps of closing a watering can mold along a seam, blow-molding the watering can in the mold, and punching a hole in the watering can along the seam prior to opening the mold.

DETAILED DESCRIPTION OF THE DRAWINGS

Figure 1:
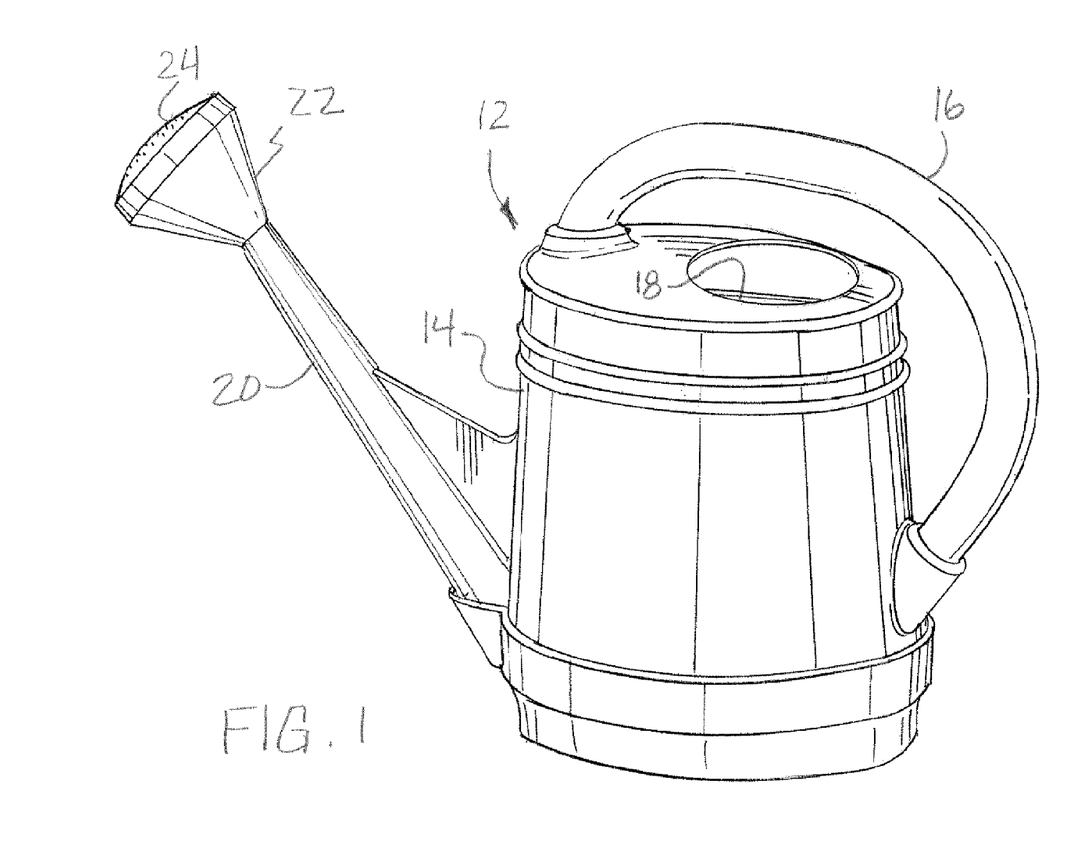
FIG. 1 is an isometric view of a pouring container made in accordance with the invention.

Referring first to FIG. 1, a typical example of a pouring container—namely, a watering can—made in accordance with the invention is illustrated. As used in the description, the terms "top," "bottom," "above," "below," "over," "under," "on top," "underneath," "up," "down," "upper," "front," "rear," "forward" and "back" refer to the objects referenced when in the orientation illustrated in the drawings, which orientation is not necessary for achieving the objects of the invention.

The watering can 12 has a body or "reservoir" section 14 that is elliptical in shape and capable of holding two to three gallons of water. The reservoir section 14 is formed by two matching cavities in two matching mold halves, as is further described below. The watering can 12 has a mold parting line resulting from the seam where the two mold halves are joined. Along this mold parting line, and parallel to the major axis of the ellipse of the reservoir section 14, the watering can 12 has a tubular handle 16 that extends over the top of the reservoir section 14 and at least part way down one side thereof. The handle 16 is elongated in this way so that the can 12 can be easily and comfortably gripped both when in an upright position and when tilted to one side, allowing the user to always grip the handle 16 over the can's center of gravity, which changes as water is poured and the can 12 becomes less full. A large fill hole 18 intersects the mold parting line underneath the handle 16 for filling the watering can 12 with the water to be poured.

On the side opposite the side down which the handle 16 extends, a hollow spout 20 extends outward and upward from the vicinity of the bottom of the reservoir section 14. At the end of the spout there is a frusto-conical portion 22, commonly called a "rose," flaring outward from a diameter of about one inch or less to a slightly convex surface 24 having a diameter of about three and one-half inches. The convex surface 24 has a plurality of holes therein, through which water pours in a shower pattern.

Figure 2:
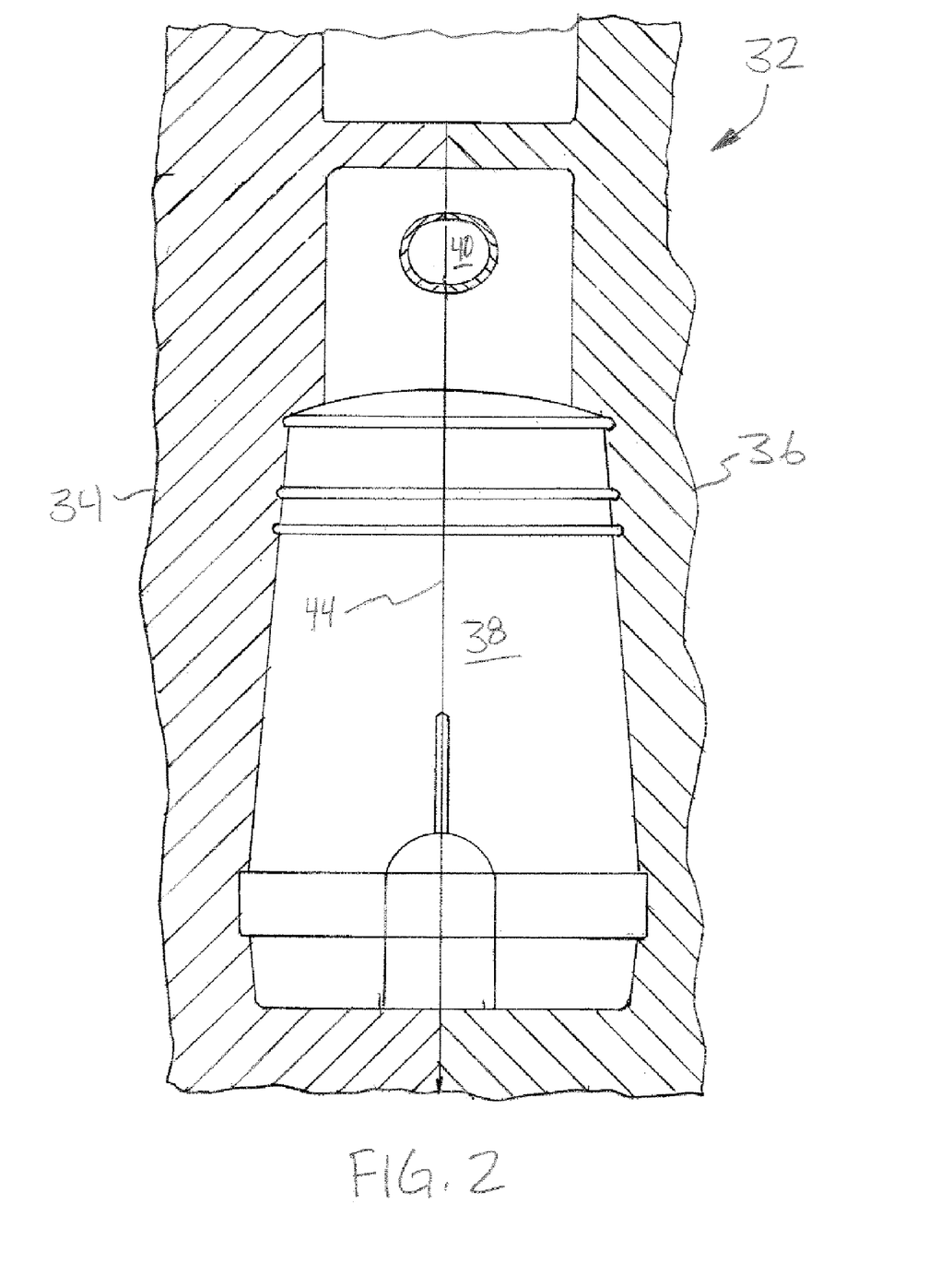
FIG. 2 is rear, cross-sectional view of an apparatus in accordance with the invention for making the pouring container of FIG. 1.
Figure 3:
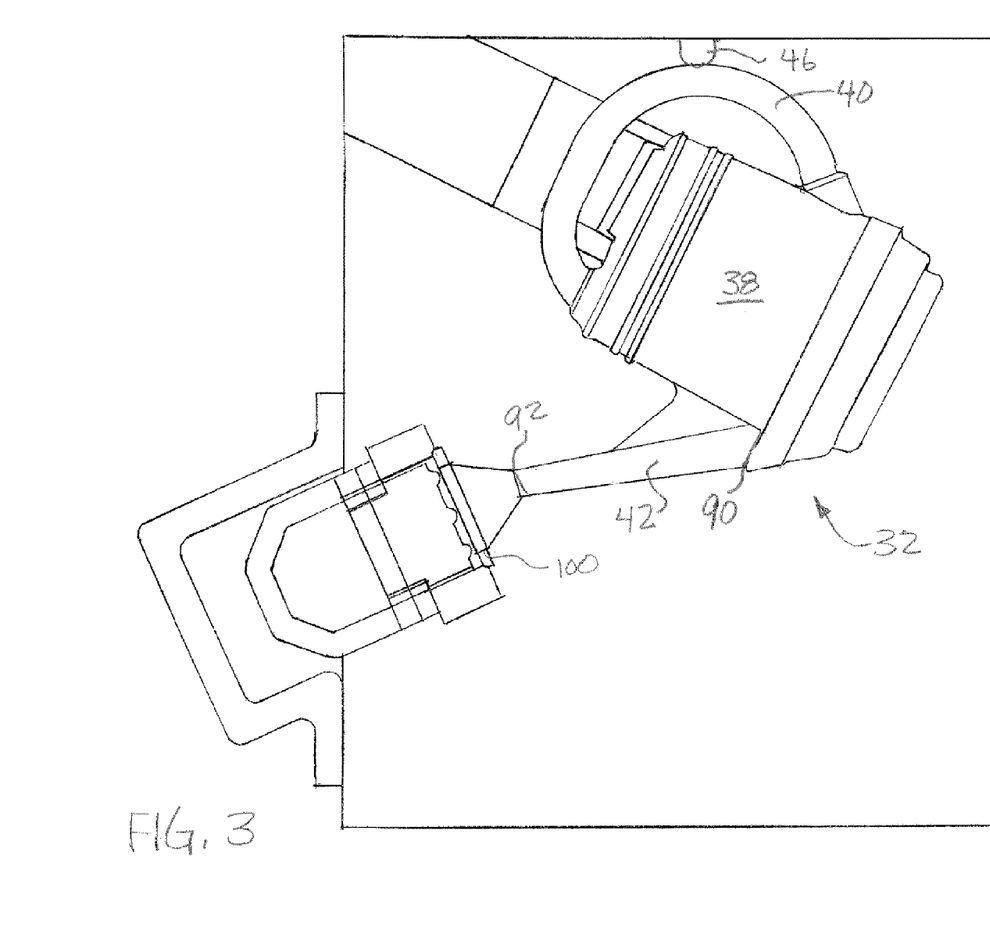
FIG. 3 is a side view of an embodiment of the apparatus of FIG. 2.

The basic components of one embodiment of an apparatus for facilitating the creation of holes in a blow-molded container in accordance with the invention are illustrated in FIGS. 2–3. A mold 32 is comprised of a first mold portion 34 and a second mold portion 36, which, when located adjacent each other, at least partially enclose a reservoir cavity 38, handle cavity 40, and spout cavity 42. In operation, a parison (not shown) is placed between the mold portions 34, 36, which are then pressed adjacent each other. Each of the cavities 38, 40, 42 encloses a part of the parison, and any unnecessary portions of the parison are pinched off at the seam 44 between the two mold portions 34, 36. Fluid pressure is then introduced through an inlet 46, which blows the parison against the surface of the cavities 38, 40, 42, thereby molding the parison into the shape of a container having a reservoir, a handle and a spout. The pressure is maintained until the molten material cools and hardens. The first and second mold portions 34, 36 are then separated, the molded container 12 is removed from the mold 32, and any excess flash resulting from the parison being pinched off is cut or broken away from the container 12.

Figure 4:
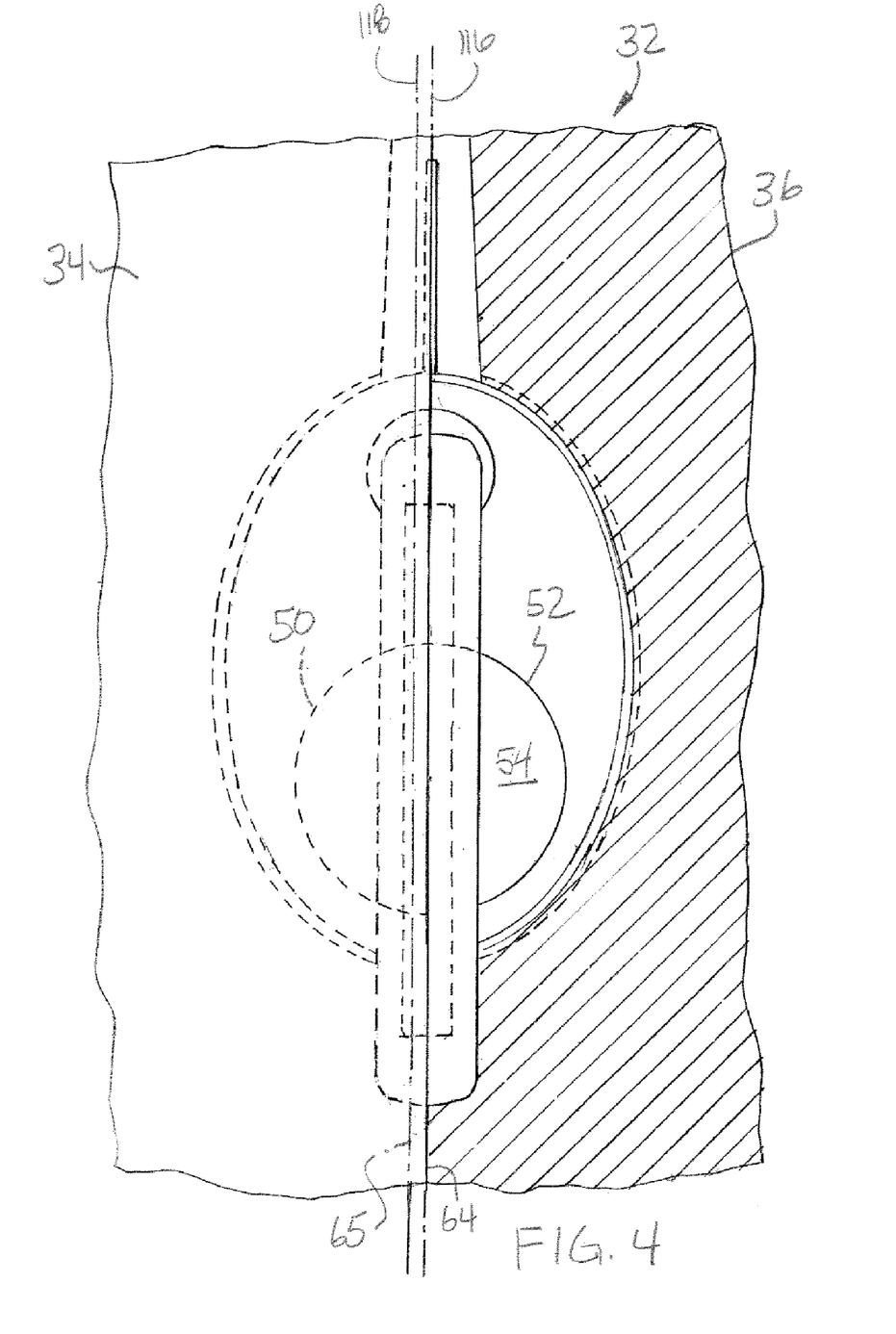
FIG. 4 is a top view in partial cross-section of an embodiment of the apparatus of FIG. 2.
Figure 5:
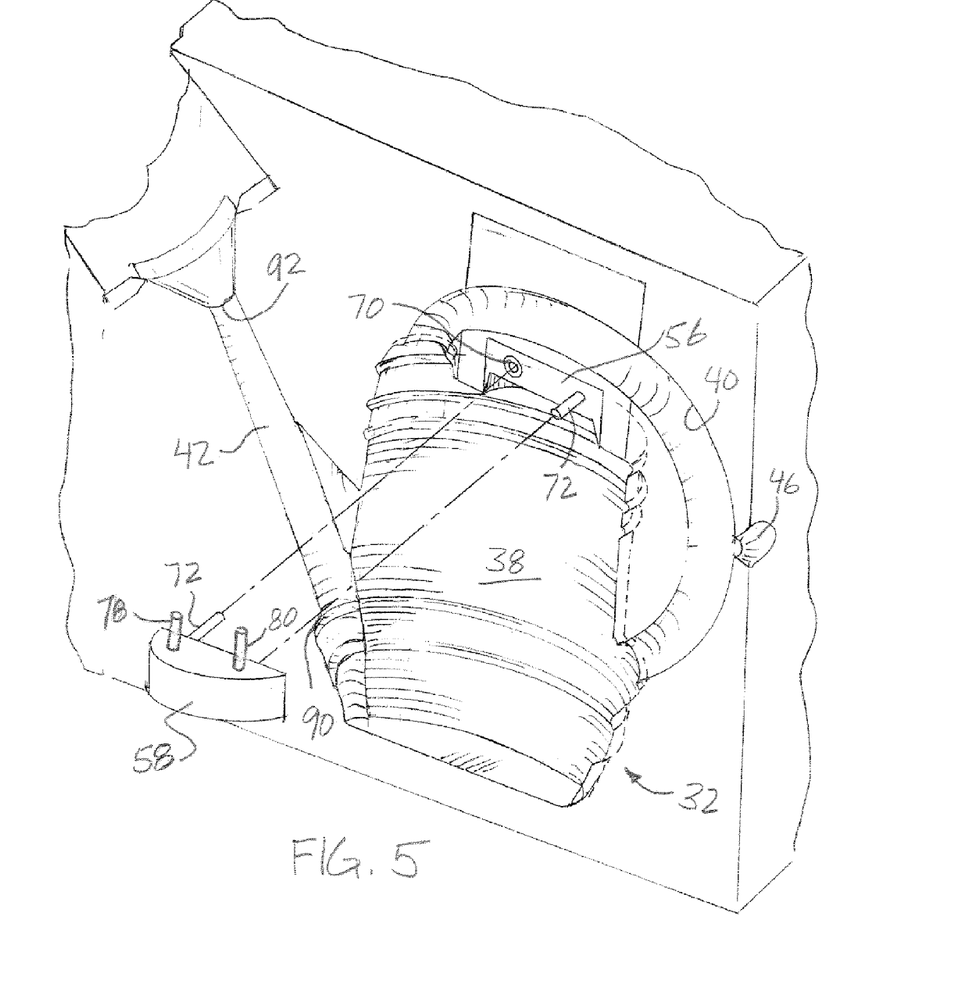
FIG. 5 is an exploded view of part of the apparatus of FIG. 2.
Figure 6:
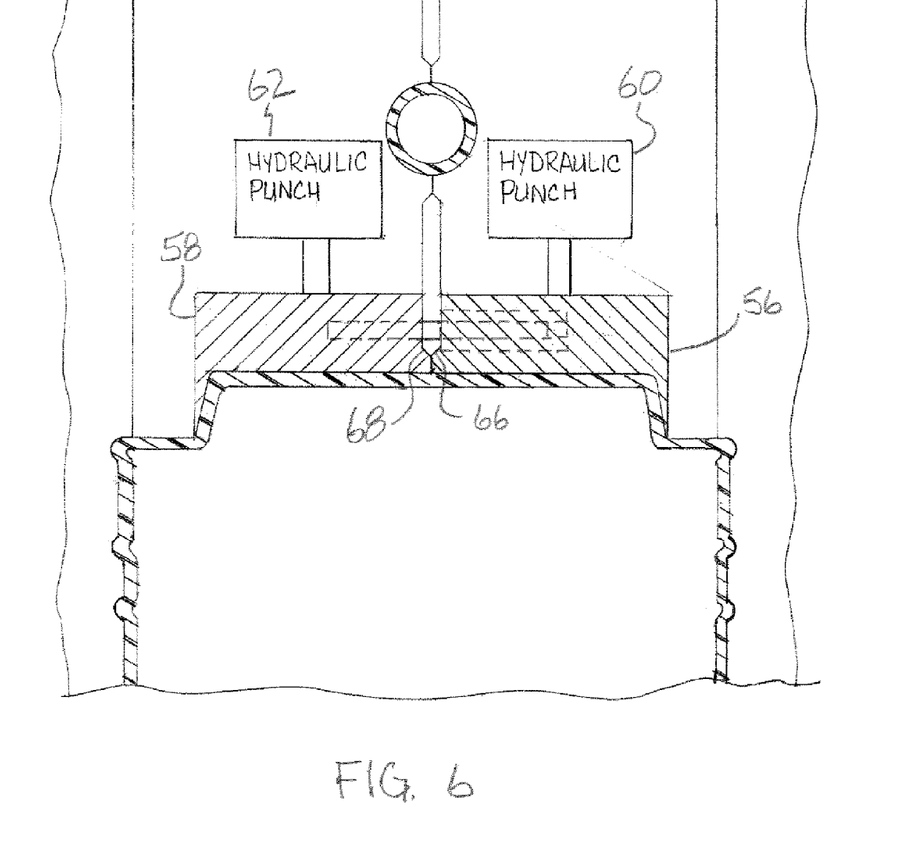
FIG. 6 is a rear, cross sectional view of part of an embodiment of the apparatus of FIG. 2.
Figure 7:
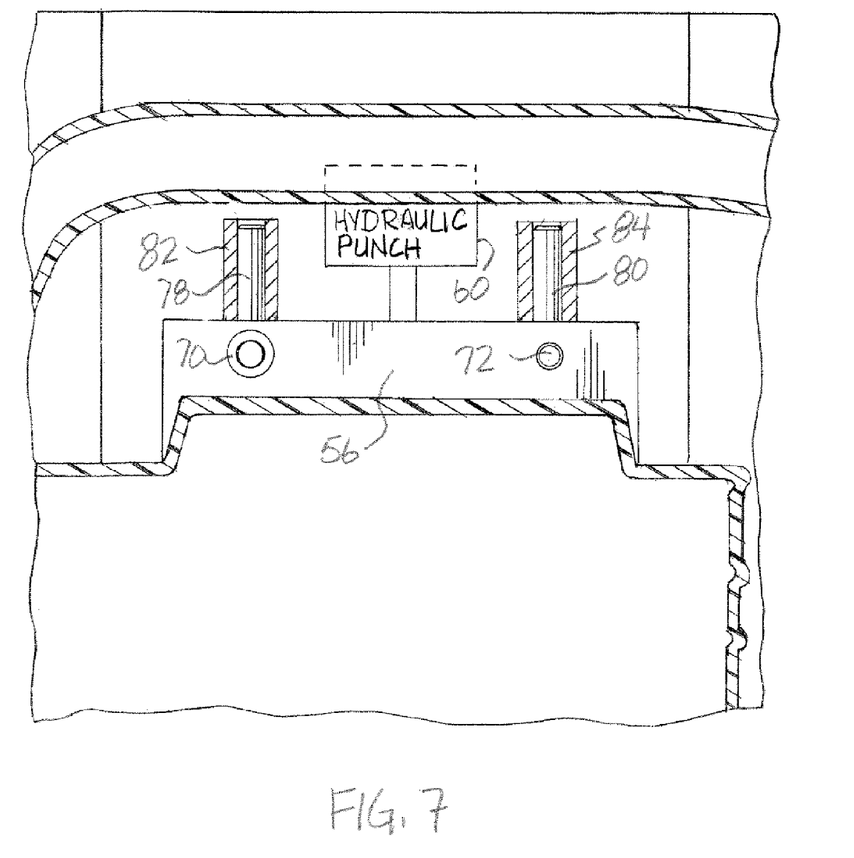
FIG. 7 is a side, cross-sectional view of part of an embodiment of the apparatus of FIG. 2.

As shown in FIG. 4, each mold portion 34, 36 has a gap 50, 52, such that, when the mold portions 34, 36 are moved adjacent each other, a hole 54 is formed in the mold 32. As illustrated in FIGS. 5–7, first and second punches 56, 58 each has a rounded edge that is disposed in the gaps 52, 50, respectively. The first and second punches 56, 58 have actuators 60, 62, respectively, for advancing the punches through the wall of the parison being blown against the surface of the reservoir cavity 38 and creating a hole therein. In some embodiments, these actuators are hydraulically powered.

By creating the hole 54 in this manner, one is able to punch a hole in the wall of the reservoir portion 14 of the watering can 12 that intersects with any vertical plane 64, 65 of the handle portion 16 of the container 12. Accordingly, regardless of any variations in the shape or width of the handle portion 16, one can still easily create a hole 54 that intersects the vertical plane 64 along the longitudinal axis of the handle cavity 40 or any vertical plane 65 parallel to the longitudinal axis of the handle cavity.

Various mechanisms can be employed to maintain alignment of the punches 56, 58. For example, as shown if FIG. 6, in some embodiments, recesses 66, 68 may be provided in the faces of the punches 56, 58, respectively, for receiving flash resulting from excesses portions of the parison being pinched between the mold portions 34, 36. As shown in FIG. 7, in other embodiments, at least one pin 70 may be used to temporarily join the first and second punches, 56, 58 to keep the punches aligned with each other. For example, the first and second punches 56, 58 may each include a pin 72 and a bushing 70 for receiving the pin 72 of the opposing punch. In other embodiments, the first punch 56 may include a pair of pins 72 protruding from its straight edge, and the second punch 58, in turn, includes two bushings 70 for receiving the pins 72. Accordingly, when the first and second mold portions 34, 36 are joined together, the pins 72 enter the bushings 70 and keep the first and second punches 56, 58 from moving relative to one another. Additionally, in some embodiments, at least one of the punches 56, 58 includes at least one vertical pin 78, 80 to be inserted into a vertical bushing 82, 84 in order to maintain vertical alignment.

As shown in FIG. 3, the spout cavity 42 has a first end 90, in communication with the reservoir cavity 38, and a second end 92. When the first and second mold portions 34, 36 are moved adjacent each other, a third mold portion 100 is moved towards the second end 92 of the spout cavity such that the wall of the parison may be blown against the molding surface 102, as shown in FIG. 8.

Figure 8:
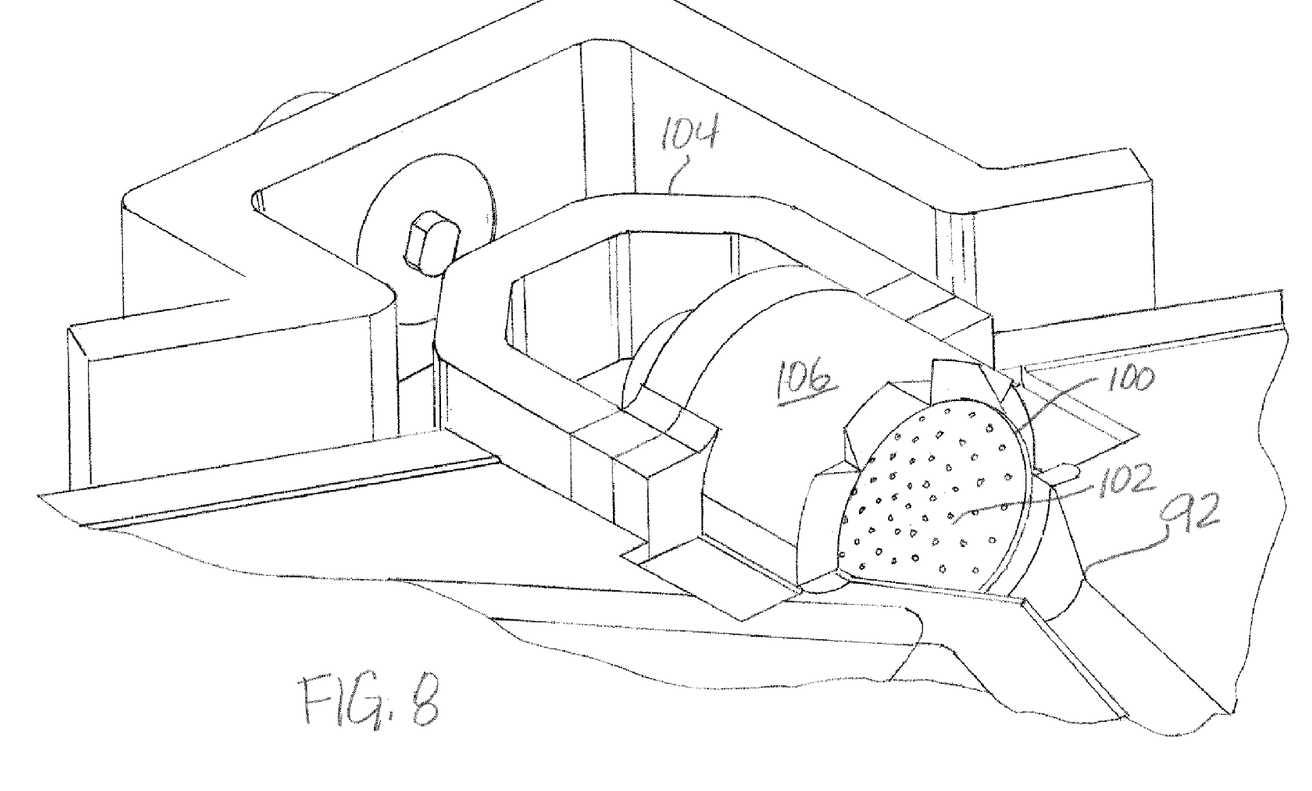
FIG. 8 is an isometric view of part of an embodiment of the apparatus of FIG. 2.
Figure 9:
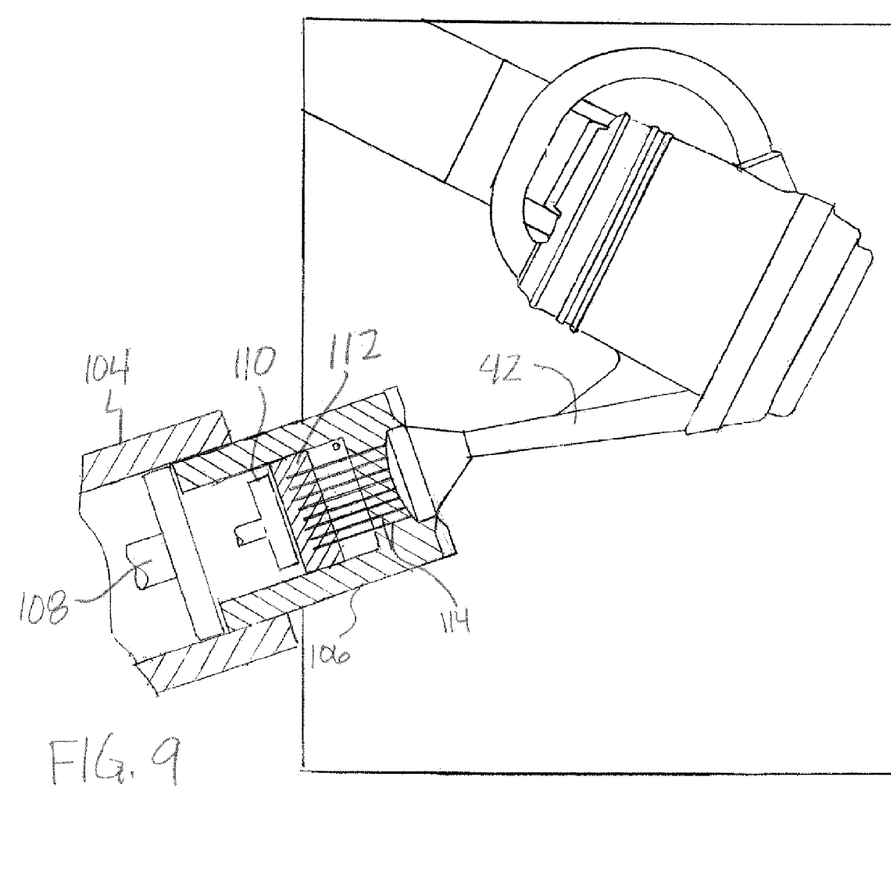
FIG. 9 is a side view of an embodiment of the apparatus of FIG. 2.

As illustrated in FIGS. 8–9, in certain advantageous embodiments, an outer housing 104 is mounted to the first mold portion 34. An inner housing 106 is disposed in the outer housing 104. When the second mold portion 36 is moved adjacent the first mold portion 34, a housing actuator 108 advances the inner housing 106 towards the second end 92 of the spout cavity to move a wall member molding surface 102 into a position where the wall of the parison can be blown against it. In some embodiments, the surface 102 is slightly concave, thereby producing a rose portion 22 of the watering can 12 with a convex surface 24 (as shown in FIG. 1). When the wall of the parison is blown against the surface 102, a die actuator 110 advances a die 112 in the inner housing 106. The die 112 has a plurality of pins 114 protruding therefrom. When the die 112 is advanced, the pins 114 create a plurality of holes in the convex surface of the watering can 12. In this way, a smooth, convex surface 24 having a plurality of pouring holes is created that intersects a vertical plane 116, 118 of the spout cavity 42.

It should be understood that the foregoing is illustrative and not limiting, and that obvious modifications may be made by those skilled in the art without departing from the spirit of the invention. Accordingly, reference should be made primarily to the accompanying claims, rather than the foregoing specification, to determine the scope of the invention.

What is claimed is:

1. An apparatus for facilitating the creation of holes in a blow-molded container, comprising:
   a mold comprising first and second mold portions that, when located adjacent each other along a seam, at least partially enclose a reservoir cavity against which a wall of the blow-molded container is blown during blow molding;
   wherein said first and second mold portions have respective first and second gaps therein that, when said first and second mold portions are located adjacent each other, form a hole in said mold that intersects the seam;
   a first punch that, when in a first position, is disposed within the first gap; and
   a second punch that, when in a first position, is disposed within the second gap;
   wherein, when said first and second mold portions are located adjacent each other, said first punch is located adjacent said second punch such that, when said first and second punches are in a second position, at least part of each of said punches is extended past the wall of the blow molded container and inside the reservoir cavity such that said punches collectively create one hole in the wall of the blow molded container.

2. The apparatus of claim 1, wherein said first punch has a rounded edge that is disposed in the first gap when in the first position, said second punch has a rounded edge that is disposed in the second gap when in the first position, and each of said punches has a straight edge that is adjacent the straight edge of the other punch when said first and second mold portions are located adjacent each other.

3. The apparatus of claim 1, wherein:
said first punch includes at least one bushing; and
said second punch includes at least one pin disposed in said at least one bushing when said first and second mold portions are located adjacent each other.

4. The apparatus of claim 1, wherein each of said first and second punches has a recess therein for receiving flash when said first and second mold portions are moved adjacent each other.

5. The apparatus of claim 1, wherein at least one of said first and second punches includes at least one vertical pin adapted to be inserted into a vertical bushing.

6. The apparatus of claim 1, further comprising a first actuator adapted to advance said first punch through the wall of the blow molded container and a second actuator adapted to advance said second punch through the wall of the blow molded container.

7. The apparatus of claim 6, wherein said first and second actuators are hydraulic actuators.

8. The apparatus of claim 1, wherein:
said first and second mold portions, when located adjacent each other, at least partially enclose a handle cavity; and
the hole formed by the first and second gaps intersects a vertical plane of the handle cavity.

9. The apparatus of claim 8, wherein said first and second mold portions, when located adjacent other, at least partially enclose a spout cavity having a first end, in fluid communication with the reservoir cavity, and a second end.

10. The apparatus of claim 9, further comprising a third mold portion located at the second end of the spout cavity, said third mold portion having a surface that intersects a vertical plane of the spout cavity and against which the wall of the blow molded container is blown during blow molding.

11. The apparatus of claim 10, wherein the third mold portion includes at least one pin adapted to create a hole in the wall on the blow molded container.

12. The apparatus of claim 10, wherein the surface of the third mold portion is concave in order to form a convex surface on the blow molded container.

13. The apparatus of claim 10, further comprising:
an outer housing mounted to said first mold portion and adjacent the second end of the spout cavity;
an inner housing disposed in said outer housing;
wherein said third mold portion is affixed to said inner housing, said third mold portion having a plurality of holes therein;
a die disposed in said inner housing, said die having a plurality of pins protruding therefrom;
a housing actuator disposed in said outer housing adapted to move said inner housing within said outer housing when said first mold portion is moved adjacent to said second mold portion so that the wall of the blow molded container can be blown against the surface of the third mold portion during blow molding; and
a die actuator disposed in said inner housing adapted to move said die within said inner housing and cause said plurality of pins to move through the plurality of holes in the third mold portion to create a plurality of holes in the wall of the blow molded container.

14. The apparatus of claim 13, wherein the surface of the plate is concave in order to form a convex surface on the blow molded container.

15. A method of facilitating the creation of holes in a blow-molded container, comprising the steps of:
moving a first mold portion adjacent to a second mold portion along a seam, thereby at least partially enclosing a reservoir cavity and a handle cavity;
blowing a wall of the blow molded container against the reservoir cavity and the handle cavity, thereby forming a reservoir portion and a handle portion;
simultaneously extending at least part of adjacent first and second punches, which are disposed in a hole intersecting the seam, through the wall of the blow molded container and into the reservoir portion such that said punches collectively create one hole in the wall of the blow molded container.

16. The method of claim 15, wherein the punches create a hole that intersects a vertical plane of the handle.

17. A method of creating a watering can having a handle, comprising the steps of:
closing a watering can mold along a seam;
blow-molding the watering can in the mold; and
punching a hole in the watering can substantially perpendicular to a plane defined by the seam prior to opening the mold.

18. The method of claim 17, wherein the step of punching comprises punching a hole that intersects a vertical plane of the handle.

19. An apparatus for facilitating the creation of holes in a blow-molded container, comprising:
a mold comprising first and second mold portions that, when located adjacent each other along a seam, at least partially enclose a reservoir cavity having a surface against which a wall of the blow-molded container is blown during blow molding;
wherein said first and second mold portions have respective first and second gaps therein that, when said first and second mold potions are located adjacent each other, form a hole in the reservoir cavity surface that intersects the seam;
a first punch that, when in a first position, is disposed within the first gap; and
a second punch that, when in a first position, is disposed within the second gap;
wherein, when said first and second mold portions are located adjacent each other, said first punch is located adjacent said second punch such that, when said first and second punches are in a second position, at least part of each of said punches is extended past the wall of the blow molded container and inside the reservoir cavity such that said punches collectively create one hole in the wall of the blow molded container.

20. The apparatus of claim 19, wherein:
said first and second mold portions, when located adjacent each other, at least partially enclose a handle cavity; and
the hole in the reservoir cavity surface formed by the first and second gaps is substantially perpendicular to a vertical plane of the handle cavity.

21. The apparatus of claim 19, wherein said first punch has a rounded edge that is disposed in the first gap when in the first position, said second punch has a rounded edge that is disposed in the second gap when in the first position, and each of said punches has a straight edge that is adjacent the straight edge of the other punch when said first and second mold portions are located adjacent each other.

22. The apparatus of claim 19, wherein:
said first punch includes at least one bushing; and
said second punch includes at least one pin disposed in said at least one bushing when said first and second mold portions are located adjacent each other.

23. The apparatus of claim 19, wherein each of said first and second punches has a recess therein for receiving flash when said first and second mold portions are moved adjacent each other.

24. The apparatus of claim 19, wherein at least one of said first and second punches includes at least one vertical pin adapted to be inserted into a vertical bushing.

25. The apparatus of claim 19, further comprising a first actuator adapted to advance said first punch through the wall of the blow molded container and a second actuator adapted to advance said second punch through the wall of the blow molded container.

26. The apparatus of claim 25, wherein said first and second actuators are hydraulic actuators.

27. The apparatus of claim 19, wherein:
said first and second mold portions, when located adjacent each other, at least partially enclose a handle cavity; and
the hole formed by the first and second gaps intersects a vertical plane of the handle cavity.

28. The apparatus of claim 27, wherein said first and second mold portions, when located adjacent other, at least partially enclose a spout cavity having a first end, in fluid communication with the reservoir cavity, and a second end.

29. The apparatus of claim 28, further comprising a third mold portion located at the second end of the spout cavity, said third mold portion having a surface that intersects a vertical plane of the spout cavity and against which the wall of the blow molded container is blown during blow molding.

30. The apparatus of claim 29, wherein the third mold portion includes at least one pin adapted to create a hole in the wall on the blow molded container.

31. The apparatus of claim 29, wherein the surface of the third mold portion is concave in order to form a convex surface on the blow molded container.

32. The apparatus of claim 29, further comprising:
an outer housing mounted to said first mold portion and adjacent the second end of the spout cavity;
an inner housing disposed in said outer housing;
wherein said third mold portion is affixed to said inner housing, said third mold portion having a plurality of holes therein;
a die disposed in said inner housing, said die having a plurality of pins protruding therefrom;
a housing actuator disposed in said outer housing adapted to move said inner housing within said outer housing when said first mold portion is moved adjacent to said second mold portion so that the wall of the blow molded container can be blown against the surface of the third mold portion during blow molding; and
a die actuator disposed in said inner housing adapted to move said die within said inner housing and cause said plurality of pins to move through the plurality of holes in the third mold portion to create a plurality of holes in the wall of the blow molded container.

33. The apparatus of claim 32, wherein the surface of the plate is concave in order to form a convex surface on the blow molded container.

* * * * *